(12) United States Patent
Nadalin et al.

(10) Patent No.: US 6,898,714 B1
(45) Date of Patent: May 24, 2005

(54) MANAGING AND EXTENDING ATTRIBUTE VALUES FOR PUBLIC KEY CRYPTOGRAPHY STANDARDS

(75) Inventors: Anthony Joseph Nadalin, Austin, TX (US); Bruce Arland Rich, Round Rock, TX (US); Theodore Jack London Shrader, Austin, TX (US); Julianne Yarsa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,307

(22) Filed: Jan. 6, 2000

(51) Int. Cl.[7] .............................................. H04L 9/00
(52) U.S. Cl. .................................. 713/200; 707/103 Y
(58) Field of Search ........................... 703/103; 707/100, 707/7, 101, 102, 103 R, 103 Y, 103, 103 Z; 713/156, 173, 175, 176; 380/277, 282, 285

(56) References Cited

U.S. PATENT DOCUMENTS 5,261,098 A * 11/1993 Katin et al. ..................... 707/1

OTHER PUBLICATIONS

RSA Laboratories. PKCS #9 v2.0: Selected Object Classes and Attribute Types—Draft #3. Oct. 22, 1999. RSA Laboratories. v2.0.*
PKCS #9 v2.0: Selected Object Classes and Attribute Types—Draft #3; Oct. 22, 1999; pp. 1–36.
An Overview of the PKCS Standards; Kaliski, Burton S.; Nov. 1, 1993; pp. 1–27.
A Layman's Guide to a Subset of ASAN.1, BER and DER; Kalisk, Burton S.; Nov. 1, 1993; pp. 1–38.
PKCS #9: Selected Attribute Types; Nov. 1, 1993; pp. 1–10.

* cited by examiner

Primary Examiner—Kim Vu
Assistant Examiner—Tracey Akpati
(74) Attorney, Agent, or Firm—Duke W. Yee; Volel Emile; Stephen J. Walder, Jr.

(57) ABSTRACT

A method and system for processing PKCS-attributes and user-defined attributes in heterogeneous environment is provided. Attributes are registered with a PKCS9 gateway class, and the attributes include user-defined attributes and PKCS-standard defined attributes. Each of the registered attributes is associatively stored with an identifier. A method in the PKCS9 gateway class may be called with a parameter containing an object identifier for an attribute. An attribute mapping data structure is searched using the object identifier in the received parameter, and in response to finding a matching object identifier, a class identifier that has been associatively stored with the matching object identifier is retrieved from the attribute mapping data structure. A method in the class identified by the class identifier is then called. The called method may include an operation for construction, attribute conversion to and from DER-encoding, attribute differentiation, and attribute value extraction. A class hierarchy of attribute types is based on an abstract class for all attribute objects with a subclass for undefined attributes and a subclass for defined attributes. The subclass for defined attributes is further decomposed into a subclass for each PKCS-defined attribute and a subclass for each user-defined attribute.

38 Claims, 4 Drawing Sheets

```
Attribute ::= SEQUENCE{
    type AttributeType,
    values SET OF AttributeValue
}

Attribute Type  ::= OBJECT IDENTIFIER
Attribute Value ::= ANY DEFINED BY type
```

FIG. 3

```
400 → EmailAddress = SEQUENCE{
404 →     1.2.840.113459.1.9.1,  ← 402
          "javauser@acme.com", "javauser@someisp.net"  ← 406
      }

408 → ContentType = SEQUENCE{
          1.2.840.113459.1.9.3,  ← 410
412 →     1.2.840.113459.1.7.2
      }
```

FIG. 4

```
502
  ↘
EmailAddress  { 30 36 06 09 2A 86 48 86  F7 0D 01 09 01 31 29 16
                11 6A 61 76 61 75 73 65  72 40 61 63 6D 65 2E 63
                6F 6D 16 14 6A 61 76 61  75 73 65 72 40 73 6F 6D
                65 69 73 70 2E 6E 65 74

ContentType   { 30 18 06 09 2A 86 48 86  F7 0D 01 09 03 31 0B 06
                  09 2A 86 48 86 F6 33 01  07 02
  ↑
504
```

702 — PKCS9 GATEWAY CLASS IS LOADED

704 — PKCS9 GATEWAY CLASS READS THE CONFIGURATION FILE AND STORES OID/CLASS MAPPINGS

706 — THE PROGRAM INSTANTIATES AN ATTRIBUTE VIA THE PKCS9 GATEWAY CLASS

708 — PKCS9 FOLLOWS LOGIC TO RETURN CORRECT ATTRIBUTE

710 — MORE ATTRIBUTES?

*FIG. 7B*

| 1.2.840.1.113732.1.13 | 714 |
| com.netscape.NetscapeComment | 716 |
| 1.2.840.12345.1.9.1 | 718 |
| com.acme.aHr.SomeAttribute | 720 |

| Object Identifier | Class |
|---|---|
| 1.2.840.113549.1.9.1 | EmailAddress |
| 1.2.840.113549.1.9.2 | UnstructuredName |
| 1.2.840.113549.1.9.3 | ContentType |
| 1.2.840.113549.1.9.4 | MessageDigest |
| 1.2.840.113549.1.9.5 | SigningTime |
| 1.2.840.113549.1.9.6 | Countersignature |
| 1.2.840.113549.1.9.7 | ChallengePassword |
| 1.2.840.113549.1.9.8 | UnstructuredAddress |
| 1.2.840.113549.1.9.9 | ExtendedCertificateAttributes |
| 1.2.840.1.113732.1.13 | com.netscape.NetscapeComment |
| 1.2.840.12345.1.9.1 | com.acme.aHr.SomeAttribute |
| ⋮ | ⋮ |

MANAGING AND EXTENDING ATTRIBUTE VALUES FOR PUBLIC KEY CRYPTOGRAPHY STANDARDS

BACKGROUND OF THE INVENTION

1. Technical Field

The present invention relates generally to an improved data processing system and in particular to a method and an apparatus for implementing Public Key Cryptography Standards (PKCS). Still more particularly, the present invention provides a method for manipulating PKCS-attributes and user-defined attributes in a PKCS compliant system.

2. Description of the Related Art

Public Key Cryptography Standard (PKCS) is a set of documents published by RSA Laboratories and serves to define data types and algorithms used in public-key cryptography. Public-key cryptography is a technology in which encryption and decryption involve the use of a public key and a private key, and either can encrypt and/or decrypt data. A user gives his or her public key to other users, keeping the private key to himself or herself. Data encrypted with a public key can be decrypted only with the corresponding private key, and vice versa.

The PKCS set of standards has been developed to assure that software using cryptography at two different sites could work together even when the software is developed by different vendors for a variety of purposes. In particular, standards are being developed to allow agreement on digital signatures, digital enveloping, digital certification, and key agreement. However, interoperability requires strict adherence to communicable formats, and PKCS provides a basis for interoperable standards in heterogeneous environments.

The present set of PKCS standards includes:

PKCS #1: RSA Encryption Standard;
PKCS #3: Diffie-Hellman Key Agreement Standard;
PKCS #5: Password-Based Encryption Standard;
PKCS #6: Extended-Certificate Syntax Standard;
PKCS #7: Cryptographic Message Syntax Standard;
PKCS #8: Private-Key Information Syntax Standard;
PKCS #9: Selected Attribute Types;
PKCS #10: Certification Request Syntax Standard;
PKCS #11: Cryptographic Token Interface Standard;
PKCS #12: Personal Information Exchange Syntax Standard;
PKCS #13: Elliptic Curve Cryptography Standard; and
PKCS #15: Cryptographic Token Information Format Standard.

Two independent levels of abstraction have been provided by these standards. The first level is message syntax, and the second level is specific encryption algorithms. The intention has been that message syntax and specific algorithms should be orthogonal. In other words, a standard for the syntax of digitally signed messages should be able to work with any public-key algorithm, not just RSA, the public-key algorithm invented by Rivest, Shamir, and Adleman involving exponentiation modulo the product of two large prime numbers; and a standard for RSA should be applicable to many different message syntax standards.

PKCS provides definitions of data objects that may be created, sent, and received between parties to a communication, while other standards are used to define the encoding syntax of the data streams containing these types of data objects. Abstract Syntax Notation One, abbreviated ASN.1, is a notation for describing abstract types and values. The Basic Encoding Rules (BER) for ASN.1 give one or more ways to represent any ASN.1 value as an octet string. The Distinguished Encoding Rules (DER) for ASN.1 are a subset of BER, and give exactly one way to represent any ASN.1 value as an octet string. DER is intended for applications in which a unique octet string encoding is needed, as is the case when a digital signature is computed on an ASN.1 value. ASN.1 and DER encoding are general purpose methods that can be applied to many domains in addition to PKCS.

One of the PKCS standard documents, PKCS #9, defines a set of attributes that can be used in other PKCS standards. PKCS #9 defines selected attribute types for use with various types of other data objects within other PKCS-standards, such as PKCS #6 extended certificates and PKCS #7 cryptographic messages. For example, PKCS #7 defines the syntax for several cryptographically protected messages, including encrypted messages and messages with digital signatures. PKCS #7 also allows arbitrary attributes, such as signing time, to be authenticated along with the content of a message. Originally an outgrowth of Internet Privacy-Enhanced Mail, PKCS #7 has become the basis for the widely implemented Secure/Multipurpose Internet Mail Extensions (S/MIME) secure electronic mail specification, an Internet e-mail security standard that employs public key encryption. PKCS #7 has become a basis for message security in systems as diverse as the Secure Electronic Transaction (SET) specification for bank systems.

Since PKCS #9 provides attributes to support other components in the PKCS set of standards, it is important that any software that processes PKCS #9 attributes handle these attributes in a robust manner. For example, a software application could be written such that it has knowledge of attributes defined as part of the PKCS #9 standard, and the application could treat unknown attributes as "undefined" attributes. However, given the fact that this set of standards continues to evolve, it is important for software that handles PKCS #9 attributes can handle "extended" attribute or user-defined attributes. Beyond the attributes that are defined as part of the standard, a software developer may desire to process a user-defined set of attributes along with the standard list of attributes.

Therefore, it would be advantageous to have an architecture and a method for manipulating PKCS attributes that allows a data processing system to be extended to accommodate additional attributes.

SUMMARY OF THE INVENTION

A method and system for processing PKCS-attributes and user-defined attributes in heterogeneous environment is provided. Attributes are registered with a PKCS9 gateway class, and the attributes include user-defined attributes and PKCS-standard defined attributes. Each of the registered attributes is associatively stored with an identifier. An object-oriented method in the PKCS9 gateway class may be called with a parameter containing an object identifier for an attribute. An attribute mapping data structure is searched using the object identifier in the received parameter, and in response to finding a matching object identifier, a class identifier that has been associatively stored with the matching object identifier is retrieved from the attribute mapping data structure. A method in the class identified by the class identifier is then called. The called method may include an operation for construction, attribute conversion to and from DER-encoding, attribute differentiation, and attribute value extraction. A class hierarchy of attribute types is based on an abstract class for all attribute objects with a subclass for undefined attributes and a subclass for defined attributes. The subclass for defined attributes is further decomposed into a subclass for each PKCS-defined attribute and a subclass for each user-defined attribute.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a software methodology for managing PKCS #9 attributes that may be associated with a variety of data objects. These data objects are formatted according to other standards in the PKCS set of standards. The data objects and their associated attributes may be embedded within messages that are sent within a distributed data processing system between parties that desire certain types of security features provided by the PKCS standards.

Figure 1:
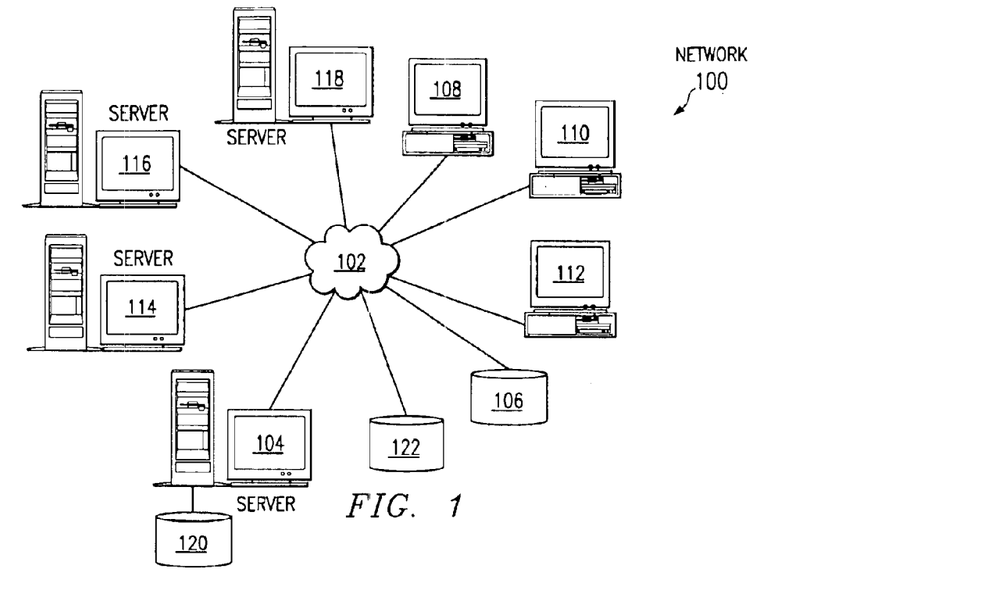
FIG. 1 is a exemplary representation of a distributed data processing system in which the present invention may be implemented.

With reference now to the figures, and in particular with reference to FIG. 1, a pictorial representation of a distributed data processing system is depicted in which the present invention may be, implemented.

Distributed data processing system 100 is a network of computers. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. In addition, clients 108, 110 and 112 are also connected to network 102. These three clients may be, for example, personal computers or network computers. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. In the depicted example, distributed data processing system 100 may be the Internet, with network 102 representing a worldwide collection of networks that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention.

The present invention may be embedded within a software application that provides some type of secure messages or cryptographic features to a user for a variety of purposes. For example, an application that employs the software methodology of the present invention may execute on any of the clients or servers shown in FIG. 1. The application may use the present invention to create a data object representing an instance of a PKCS #9 attribute, which is then associated with another PKCS-related data object and embedded within a PKCS #7 cryptographic message. The cryptographic message may then be sent between clients and/or servers in network 102.

Figure 2:
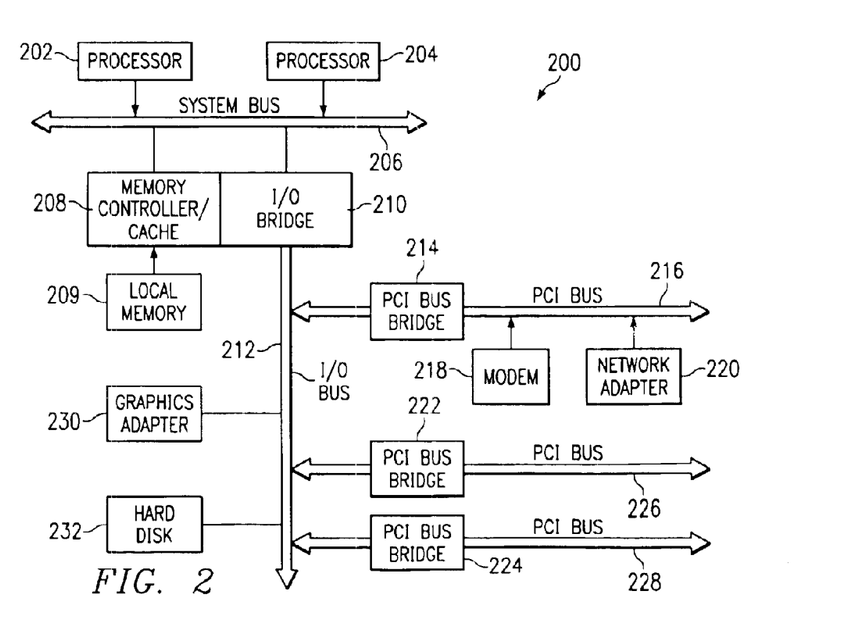
FIG. 2 is an exemplary block diagram of a data processing system that may be implemented as a server.

With reference now to FIG. 2, a block diagram of an exemplary data processing system which may be implemented as a server or client, such as server 104 or client 108 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI a local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system.

Figure 3:
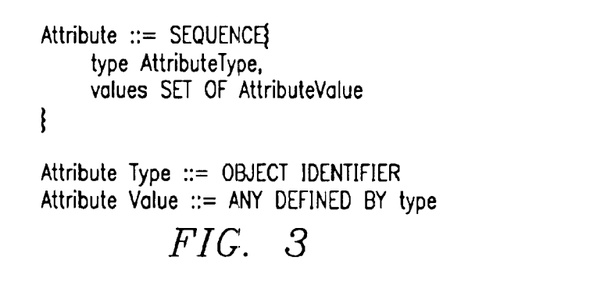
FIG. 3 is a diagram showing the Abstract Syntax Notation for the X.500 Attribute type.
Figure 4:
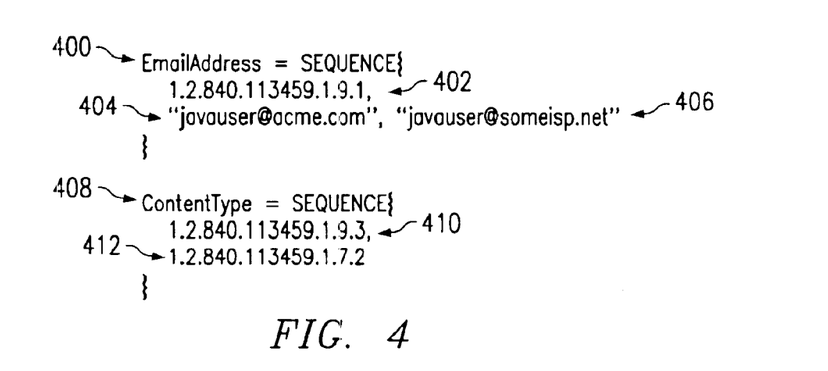
FIG. 4 is a diagram showing two examples of PKCS #9 attributes, each with sample values.
Figure 5:
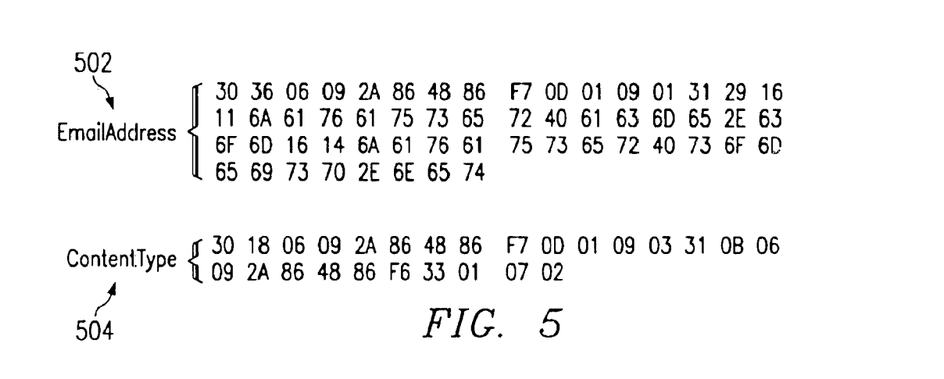
FIG. 5 shows an example of DER-encoding in hexadecimal format of the two PKCS #9 objects shown in FIG. 4.

Before describing the software methodology of the present invention for processing PKCS #9 attributes, FIGS. 3–5 provide some background information about the syntax and encoding of attributes that are used in the PKCS set of standards.

With reference now to FIG. 3, a diagram shows the Abstract Syntax Notation (ASN.1) for the X.500 Attribute type. An attribute is defined in the X.500 standard to be essentially a coupling of a unique object identifier (OID) with some value. An attribute value can be composed of one or more items, and the data type of the items themselves depends upon the type of the attribute.

As stated, PKCS #9 defines a specific set of attributes. Currently, in the version 1.1 standard, there are nine such attributes, described in more detail below in FIG. 6. The definition of each includes its object identifier, the data type of its value, and whether its value is single-valued or multi-valued.

With reference now to FIG. 4, a diagram shows two examples of PKCS #9 attributes, each with sample values. EmailAddress attribute 400 is an example of a multi-valued attribute. The object identifier 402 has two value items, 404 and 406. These values have ASN.1 data type IA5String, where IA5String is a sequence of ASCII characters. ContentType attribute is a single-valued attribute 408. The object identifier 410 has a single value 412 that is also an object identifier.

ASN.1 notation defines the data types, and any software application can implement data type definitions in any suitable way: a C struct, a Java object, and a Pascal record are possible implementations. These disparate objects must be encodable in some standard way to ensure interoperability among the software implementing the defined objects. One way to accomplish this uniform encoding is through the Distinguished Encoding Rules (DER), a method to transform an ASN.1-defined object into a byte array in standard format. In this way, a software entity on one system may implement an ASN.1 object in one fashion, encode it via DER, and transmit it to another software entity, which can then parse the DER byte array into its own representation of the same ASN.1 object originally encoded.

With reference now to FIG. 5, a figure shows DER-encoding in hexadecimal format for the two PKCS #9 objects depicted in FIG. 4. In particular, encoding 502 is for EmailAddress and encoding 504 is for ContentType. The important feature of these encodings is that they are "distinguished" or unique.

As mentioned previously, an application may use the present invention to create a data object representing an instance of a PKCS #9 attribute, which may then be associated with another PKCS-related data object and embedded within a message sent across a network. There are basically four operations that must be implemented within a robust application to fully support PKCS #9 attributes:

(1) An application should be able to build an attribute from its constituent parts, its object identifier, and its value.

(2) An application should be able to convert an attribute object into a DER-encoded byte stream for transmission to other systems.

(3) An application should be able to convert a DER-encoded byte stream into an attribute object.

(4) An application should be able to distinguish one attribute from another and extract an attribute's value information.

The PKCS #9 architecture outlined in this invention supports these PKCS attribute operations, such as construction, attribute conversion to and from DER-encoding, attribute differentiation, and attribute value extraction. By implementing the software methodology of the present invention in an object-oriented programming language, such as Java, some of these operations may be facilitated by having very specific attribute classes while other operations are facilitated by more general classes. The class hierarchy described below combines elements of specific and general classes to implement PKCS-attribute-related operations in a manner which is extensible to user-defined attributes. "User-defined attributes" may include attributes that have specific user purposes in specific applications, i.e. attributes which are not contemplated as eventually becoming standard-defined attributes or are not promulgated as standard-defined attributes.

In addition, a "user-defined attribute" may also include attributes that were not part of the PKCS #9 standard when a software application implementing the present invention was deployed. At some later time, when an attribute that was previously recognized as a user-defined attribute then becomes part of the PKCS #9 standard, the application may be updated so that the application recognizes the PKCS #9 standard-defined attribute and so that the attribute is no longer recognized as a user-defined attribute. In this manner, the present invention allows an application to be extended to user-created attributes and subsequent, standard-defined attributes.

Figure 6:
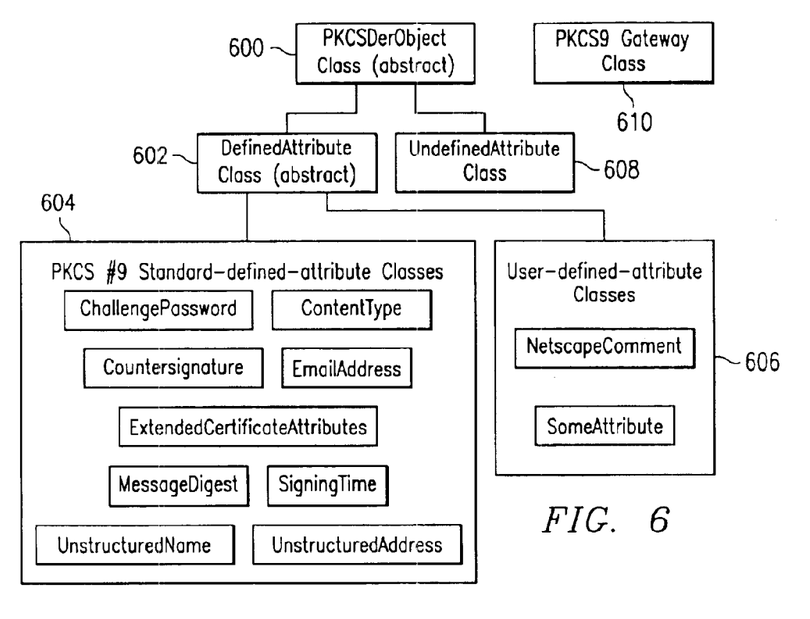
FIG. 6 is a class hierarchy diagram that shows an exemplary set of classes for use in the software methodology of the present invention for implementing PKCS-attribute-related operations in an extensible manner.

With reference now to FIG. 6, a class hierarchy diagram shows an exemplary set of classes for use in the software methodology of the present invention for implementing PKCS-attribute-related operations in an extensible manner. PKCSDerObject 600 is an abstract class representing any object that can into encoded into or decoded from a DER byte stream. All subclasses of PKCSDerObject must implement encode and decode methods.

DefinedAttribute 602 is an abstract class representing any attribute that is "known" to the system; that is, those attributes that have individual class implementations and that are registered with the PKCS9 class. The registration process is discussed below with respect to the PKCS9 gateway class 610. The subclasses of DefinedAttribute 602 must implement a number of methods to return attribute-specific information such as the attribute's common name and whether the attribute is single-valued or multi-valued.

PKCS #9 standard-defined-attribute Classes 604 are a set of classes representing the attributes defined in PKCS #9. As of version 1.1 of the PKCS #9 standard, there are nine defined attributes: ChallengePassword, EmailAddress, SigningTime, ContentType, ExtendedCertificateAttributes, UnstructuredName, Countersignature, MessageDigest, and UnstructuredAddress. Additional classes can be added to this set as further versions of the PKCS #9 standard are developed and approved. All of these classes implement the abstract methods in their parent class, DefinedAttribute 602.

User-defined-attribute Classes 606 are a set of classes representing ASN.1 Attribute types that are not defined in the PKCS #9 standard (and therefore not represented by a class in PKCS #9 standard-defined-attribute classes 604) but that are known to the system and registered with the PKCS9 gateway class 610. Like the standard PKCS #9 standard-defined-attribute classes 604, user-defined-attribute classes must implement the abstract methods in DefinedAttribute.

UndefinedAttribute 608 represents any attribute that is unknown to the system. That is, there is not a specific class that implements the attribute, so the PKCS9 class 610 cannot map the attribute object identifier to an implementing class. The UndefinedAttribute class 608 allows the decoding of arbitrary attributes that may be undefined on the system. The UndefinedAttribute class 608 includes an ObjectIdentifier data member which is the attribute OID and a byte array data member which is the DER-encoding of the attribute value.

PKCS9 gateway class 610 serves as the gateway to all the attributes on the system, both known and unknown. It has a variety of getAttribute( ) methods that allow easy instantiation of an attribute by OID and value, string name and value, or DER-encoding. PKCS9 gateway class 610 will interpret the input and return an instance of the proper DefinedAttribute or an UndefinedAttribute.

All attributes defined in the PKCS #9 standard (and therefore represented by a class in PKCS #9 standard-defined-attribute classes 604) are statically registered within the PKCS9 gateway class 610. That is, the PKCS9 gateway class 610 has a mapping of each attribute's unique OID to the class that implements it. To register user-defined attributes, the user must first implement the attribute as a subclass of DefinedAttribute since the PKCS9 gateway class 610 uses the abstract methods defined in DefinedAttribute and then enters the attribute OID and its implementing class in a configuration file.

Figure 7A:
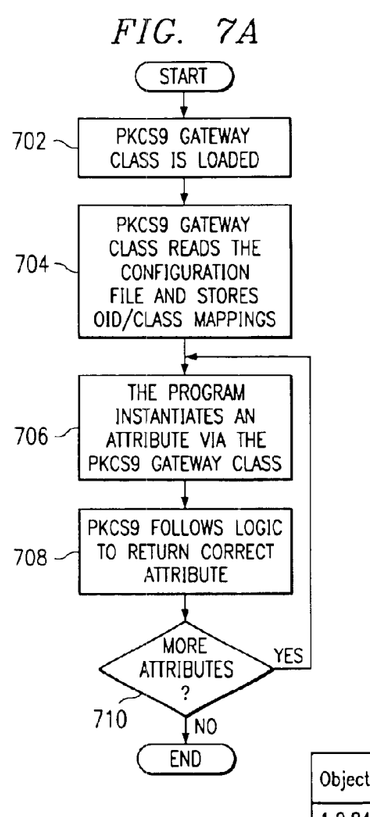
FIG. 7A is a flowchart outlining an exemplary operation for requesting an attribute object via the PKCS9 class in accordance with an embodiment of the present invention.

FIG. 6 shows two user defined attributes: "NetscapeComment", an attribute used in many applications yet not one of the attributes defined in the PKCS standard, and "SomeAttribute", an exemplary name chosen to suggest a user-defined attribute for a particular application. When the PKCS9 gateway class 610 is first loaded, it will read a configuration file and internally store the mapping information for OIDs of user-defined attributes. Thereafter, when a getAttribute( ) method is called and the PKCS9 gateway class 610 detects a user-defined OID in the input arguments, it will be able to access the proper class for attribute instantiation. This registration process and the basic means of obtaining an attribute via the PKCS9 gateway class 610 is discussed in more detail below with respect to FIG. 7. The logic followed by the getAttribute( ) method is discussed in more detail further below with respect to FIG. 8.

Note that a configuration file may be in a default location or may be in a location defined by a Java property defined in the java security configuration file. If a configuration file is property-defined, the PKCS9 gateway class 610 must have permission to read the property. In either case, the PKCS9 gateway class 610 must have permission to read the configuration file itself.

Before discussing flowcharts for the algorithms associated with the present invention, it is useful to discuss the PKCS-attribute-related operations of construction, attribute conversion to and from DER-encoding, attribute differentiation, and attribute value extraction in more detail.

Constructing an attribute using the classes defined in the present invention can be accomplished in different ways, depending upon what information the user has at the time. If the type of the required attribute is known, then that attribute may be instantiated directly using a constructor that takes a meaningful data type. For example, if an UnstructuredName attribute is needed, that attribute may be instantiated by calling the Unstructuredname constructor that takes a String argument (the name). There is no need to convert the name value to the DER-encoding of its ASN.1 data type. As another example, the ChallengePassword attribute may be instantiated by calling the ChallengePassword constructor that takes a char[ ] argument (the password). Note that security-sensitive data, such as passwords, should not be represented as String data types which are immutable.

If the user has an object identifier (OID) and some value, but does not know to which attribute class the OID corresponds, the PKCS9.getAttribute(ObjectIdentifier, Object) method associated with the PKCS9 class, such as the PKCS9 gateway class 610 shown in FIG. 6, may be used to construct the attribute. The PKCS9 class will return an instance of the correctly defined attribute if the attribute OID is known to the system or an instance of UndefinedAttribute if the OID is unknown to the system.

If the user has only a DER-encoded byte stream, the PKCS9.getAttribute(byte[ ]) method may be used. This method will extract the attribute OID from the byte stream and then instantiate and return the proper attribute object.

Another operation is the conversion of an attribute object to a DER-encoded byte stream. Because all attributes are subclassed from PKCSDerObject, each must implement an encode( ) method. Converting an attribute object to its DER-encoding requires a simple call to the encode( ) method.

The reverse conversion of a DER-encoded byte stream to an attribute object is also possible. Because all attribute classes are subclassed from PKCSDerObject, each attribute class must implement a decode( ) method. Explicitly creating an attribute object from a DER byte array requires using the attribute's default constructor and then calling that object's decode( ) method. Alternatively, the PKCS9 gateway class, such as PKCS9 gateway class 610 in shown in FIG. 6, can be used to convert any DER-encoded attribute to an attribute object, and this relieves the user from having to know how to instantiate an attribute object explicitly by knowing the attributes type and calling the appropriate constructor.

Other useful operations are attribute differentiation and value extraction. An important usability feature of attributes is the ability to easily distinguish them from one another. Having a separate class implement each attribute allows the user to search for a particular attribute type using the "instanceof" operator. For example, X.509 extended certificates can include attributes. To find the signing time of an extended certificate, one could cycle through the attribute objects in the certificate object using the "instanceof SigningTime" comparator. There is no need to examine OIDs values within the attribute objects to find the correct one.

It is also preferable to be able to extract the attribute value in a form that is immediately meaningful, rather than in a form that must be converted before use. For example, the value of an EmailAddress attribute can be extracted directly into an array of Strings. This relieves the user from having to convert an internal representation of the value—whether it be a DER byte stream or a series of Objects, for example—into Strings after value extraction.

With reference now to FIG. 7A, a flowchart shows the request of an attribute object via the PKCS9 gateway class. The PKCS9 gateway class is loaded (step 702). Upon loading, the static initializer block in this class is run. Static initialization includes reading in the data from the user-defined-attribute configuration file.

The user-defined-attribute configuration file is read (step 704). The file is stored on disk either in a default location or in a location specified by a Java security property. If the latter, the PKCS9 gateway class must first read the Java property to find the file location, then access the file itself.

In the course of execution, a Java program may request an attribute instance by calling a PKCS9.getAttribute( ) method, passing in the appropriate arguments (step 706). The logic followed by the PKCS9.getAttribute( ) method (step 708) is described more fully in FIG. 8. If there are more attributes to process (step 710), then control is transferred to step 706. Otherwise, the request of the Attribute object is completed.

Figure 7B:
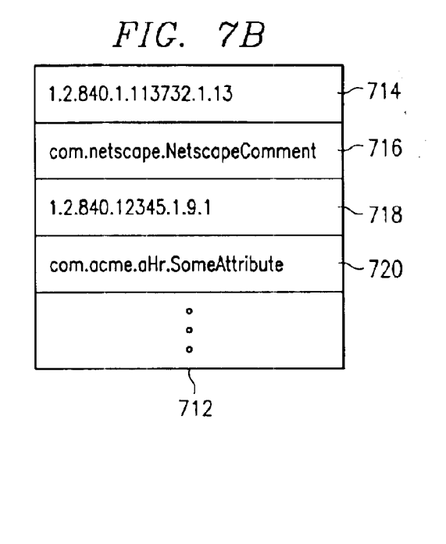
FIG. 7B is a diagram showing an example format of a user-defined attribute configuration file that maps attribute object identifiers to the classes that implement the attributes.

With reference now to FIG. 7B, a diagram shows an example format of a user-defined attribute configuration file that maps attribute object identifiers to the classes that implement the attributes. The PKCS9 gateway class reads mappings, e.g., at initialization time, in configuration file 712 and stores them internally in an appropriate data structure. In this example, object identifier 714 maps to class 716 and object identifier 718 maps to class 720.

Figure 7C:
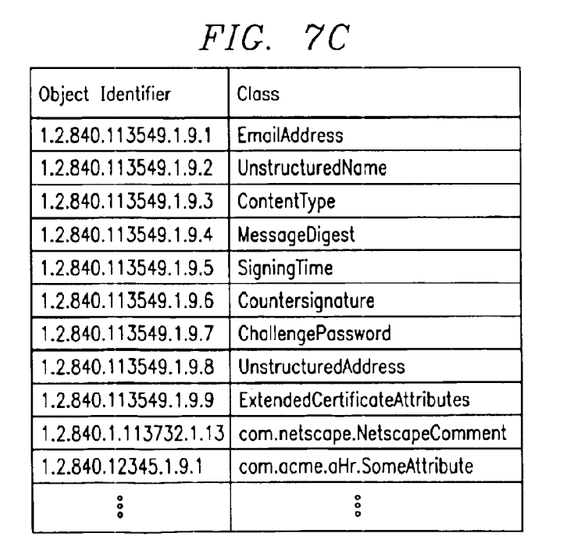
FIG. 7C is a table showing an example of mappings from object identifiers to the classes that implement the attributes.

With reference now to FIG. 7C, a table shows an example of mappings from object identifiers to the classes that implement the attributes. The first nine entries are PKCS #9 standard-defined-attribute classes where both the object identifier and class names are predefined. Since these values are fixed, they do not need to be stored in the configuration file. Rather, the information in the configuration file is added to the attribute mappings after the predefined values. As one of ordinary skill in the art will appreciate, the attribute mappings shown in FIG. 7C could be implemented as a hash table, an association list, or similar data structure. This set of mappings will contain the object identifier and the class name for all registered attributes, including the PKCS #9 standard-defined-attribute classes and extended or user-defined attributes.

When a "get"-type method in the PKCS9 gateway class is invoked, the object identifier is extracted from the argument, the class name associated with the object identifier is determined from the set of mappings, and a constructor in the associated (i.e. mapped) class is called. The PKCS9 "get" method then returns an instance of a specific defined attribute, or an instance of an UndefinedAttribute if the object identifier does not have a class mapping.

Figure 8:
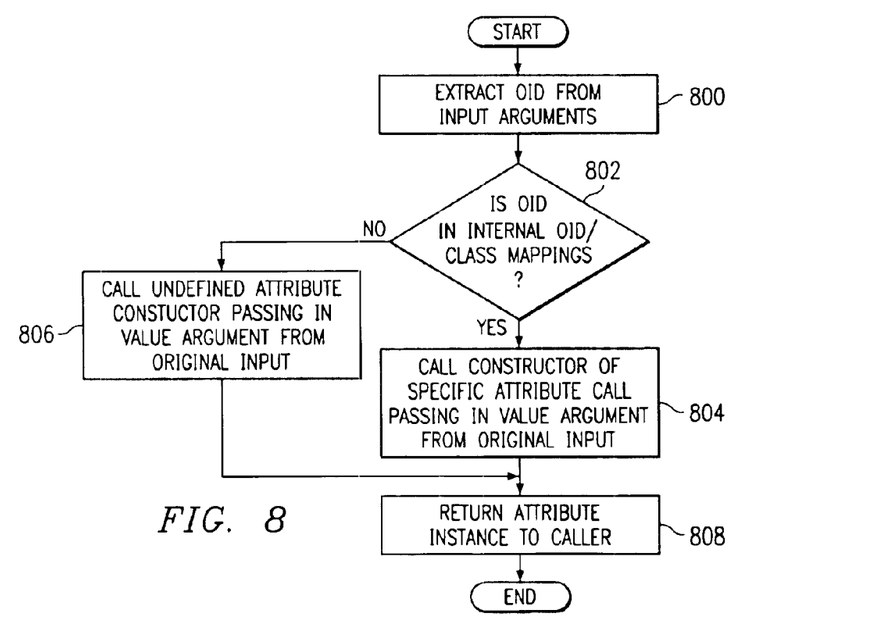
FIG. 8 is a flowchart outlining an exemplary operation of the getAttribute( ) method for the PKCS9 class in accordance with a preferred embodiment of the present invention.

With reference now to FIG. 8, a flowchart shows the logic of the getAttribute( ) method for the PKCS9 gateway class. This figure is an expansion of step 708 in FIG. 7A. Once a PKCS9.getAttribute( ) method is called, the attribute object identifier is extracted from the input arguments (step 800). Depending on the signature of the getAttribute( ) method, the OID may be in String form, in ObjectIdentifier form, or in a DER-encoded byte array. In each case, the PKCS9 gateway class is able to convert the OID to the form in which the object identifiers in the OID-class mappings for the PKCS9 gateway class are stored.

The PKCS9 class determines if the requested OID is one that has been registered, either statically (as an attribute class corresponding to the standard-defined PKCS #9 attributes) or at runtime through the user-defined attribute configuration file (step 802).

If the PKCS gateway class has found a registered OID, then a constructor of the class mapped to that OID is called with the value argument passed to the PKCS9.getAttribute( ) method (step 804). The specific attribute constructor will return an attribute instance to the PKCS9.getAttribute( ) method.

If the PKCS9 gateway class has not found a registered OID, then the constructor of the UndefinedAttribute class is called (step 806). This constructor will return an UndefinedAttribute instance to the PKCS9.getAttribute( ) method.

The PKCS9.getAttribute( ) method returns the attribute back to its caller (step 808).

The programming language for the preferred embodiment of this invention is Java, but as one of ordinary skill in the art will appreciate, implementation could be in a wide variety of programming languages, such as C, Pascal, C++, and so forth. Implementation in an object-oriented language, such as C++, would be easier than in a language like C that is not object-oriented.

In summary, the architecture outlined in the present invention provides several usability features for PKCS attributes, including those that are not defined in the PKCS #9 standard:

(1) Distinct classes for each defined attribute allows for easy instantiation either directly or through the PKCS9 gateway class.

(2) Distinct classes for each defined attribute allows for easy differentiation between attributes. A specific attribute type can be found by using the "instanceof" operator with no need to examine internal data members.

(3) Distinct classes for each defined attribute allows attribute values to be extracted in forms meaningful to the user. For example, the value of a SigningTime attribute is known to be a Date object, and is directly retrievable and usable as such. There is no need to extract values generically as Objects or as byte arrays (DER-encodings) which then must be converted to usable objects.

(4) All attributes implement encode and decode methods for easy conversion to and from DER byte streams.

(5) Both defined and undefined attributes are supported.

(6) The architecture is extendible so that new attributes can be implemented and registered with the system.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. For example, this general architecture can be utilized in a variety of operating systems. It can also be implemented in different programming languages. It can also be extended to include new PKCS attributes as the Public Key Cryptography Standards evolve over time. The embodiment was chosen and described in order to best explain the principles of the invention and the practical application, and to enable others of ordinary skill in the art to understand the invention for various embodiments with various modifications as are suited to the particular use contemplated.

What is claimed:

1. A method in a data processing system for managing data attributes, the method comprising the steps of:

registering attributes with a PKCS9 gateway class, wherein the attributes include user-defined attributes and PKCS-standard (Public Key Cryptography Standards) defined attributes;

associatively storing an identifier for each of the user-defined attributes and each of the PKCS-standard defined attributes;

calling a first object-oriented method in the PKCS9 gateway class, wherein the first object-oriented method receives a parameter comprising an object identifier for an attribute;

searching an attribute mapping data structure using the object identifier in the received parameter;

in response to a determination of a matching object identifier in the attribute mapping data structure, retrieving a class identifier associatively stored with the matching object identifier in the attribute mapping data structure; and calling a second object-oriented method in a class identified by the retrieved class identifier.

2. A method in a data processing system for managing data attributes, the method comprising the steps of:

invoking a first object-oriented method to process an attribute object, wherein the first object-oriented method is defined in an abstract class for attribute objects with a subclass for undefined attributes and a subclass for defined attributes, wherein the subclass for defined attributes is further comprised of a subclass for each PKCS-defined (Public Key Cryptography Standards) attribute and a subclass for each user-defined attribute;

invoking a second object-oriented method to process an attribute object, wherein the second object-oriented method is defined in a PKCS9 gateway class; and in response to invoking the first object-oriented method or the second object-oriented method, processing the result returned by the first object-oriented method or the second object-oriented method, wherein each defined attribute is registered with the PKCS9 gateway class, and wherein the user-defined attributes are registered with the PKCS9 gateway class by reading a configuration file when the PKCS9 gateway class is initially loaded.

3. The method of claim 2, where a PKCS compatible attribute is a unique object identifier and value, as defined by the Abstract Syntax Notation (ASN.1) for the X.500 Attribute type.

4. The method of claim 2, wherein each defined attribute is implemented as a separate class.

5. The method of claim 2, wherein PKCS-defined attributes are registered statically with the PKCS9 gateway class.

6. The method of claim 2, wherein the second object-oriented method determines a type of the attribute object by performing an instanceof comparison to registered attributes.

7. The method of claim 2, wherein the attribute object is constructed using a constructor method in a class associated with a PKCS-compatible attribute.

8. The method of claim 2 wherein, in response to determining an object identifier and a value associated with the object identifier and determining the object identifier is registered with the PKCS9 gateway class, the PKCS9 gateway class returns an instance of a registered attribute.

9. The method of claim 2 wherein, in response to determining a DER-encoded byte stream with an object identifier, the second object-oriented method in the PKCS9 gateway class returns an instance of a PKCS-compatible attribute.

10. The method of claim 9 wherein, in response to determining the object identifier from the DER-encoded byte stream is not registered with the PKCS9 gateway class, an instance of an undefined attribute is returned with the value being a DER-encoded byte stream.

11. The method of claim 9 wherein, in response to determining the object identifier from the DER-encoded byte stream is registered with the PKCS9 gateway class, an instance of an attribute with the object identifier is returned.

12. The method of claim 2, wherein a registered attribute object is encoded to a DER-encoded byte stream by using the first object-oriented method for encoding the attribute object.

13. The method of claim 2, wherein a registered attribute object represented as a DER-encoded byte stream is decoded to an attribute object by using the second object-oriented method for decoding the attribute object.

14. The method of claim 2, wherein a second object-oriented method in the PKCS9 gateway class extracts attribute values into forms, wherein the forms are strings, numbers, and/or other non-abstract data types.

15. A data processing system for managing data attributes, the data processing system comprising:
   registering means for registering attributes with a PKCS9 gateway class, wherein the attributes include user-defined attributes and PKCS-standard (Public Key Cryptography Standards) defined attributes;
   storing means for associatively storing an identifier for each of the user-defined attributes and each of the PKCS-standard defined attributes;
   calling means for calling a first object-oriented method in the PKCS9 gateway class, wherein the first object-oriented method receives a parameter comprising an object identifier for an attribute;
   searching means for searching an attribute mapping data structure using the object identifier in the received parameter;
   retrieving means for retrieving, in response to a determination of a matching object identifier in the attribute mapping data structure, a class identifier associatively stored with the matching object identifier in the attribute mapping data structure; and
   calling means for calling a second object-oriented method in a class identified by the retrieved class identifier.

16. A data processing system for managing Public Key Cryptography Standards (PKCS) compatible attributes, the data processing system comprising:
   first constructing means for constructing a new instance of an attribute object;
   first differentiating means for differentiating between attribute objects of different types;
   converting means for converting an instance of an attribute object to and/or from DER-encoding;
   first extracting means for extracting values associated with an attribute object;
   extending means for extending a set of attributes with user-defined types; and
   first registering means for registering an attribute class with a PKCS9 gateway class;
   second registering means for registering a PKCS-compatible attribute is registered with the PKCS9 gateway class;
   third registering means for registering wherein user-defined attributes are registered with the PKCS9 gateway class by reading a configuration file when the PKCS9 gateway class is initially loaded.

17. The data processing system of claim 16, where a PKCS compatible attribute is a unique object identifier and value, as defined by the Abstract Syntax Notation (ASN.1) for the X.500 Attribute type.

18. The data processing system of claim 16 further comprising:
   an abstract attribute object class with an undefined attribute object subclass and a defined attribute object subclass, wherein the defined attribute object subclass is further comprised of a subclass for each PKCS-defined attribute object and a subclass for each user-defined attribute object.

19. The data processing system of claim 16 further comprising:
   second constructing means for constructing wherein a new instance of an attribute object using a class constructor.

20. The data processing system of claim 16 further comprising:
   third constructing means for constructing a new instance of a PKCS-compatible attribute object is constructed using the PKCS9 gateway class if an attribute object identifier and a class implementing that attribute are registered.

21. The data processing system of claim 16 further comprising:
   fourth constructing means for constructing a new instance of a PKCS-compatible attribute object using the PKCS9 gateway class based on a DER-encoded byte stream.

22. The data processing system of claim 16 further comprising:
   second differentiating means for differentiating a type for an attribute object determined by performing an instanceof comparison to registered attribute classes.

23. The data processing system of claim 16 further comprising:
   encoding means for encoding an attribute object to a DER-encoded object by using an encode method of the attribute object.

24. The data processing system of claim 16 further comprising:
   decoding means for decoding an attribute object represented as a DER-encoded string to an attribute object by using a decode method of the attribute object.

25. The data processing system of claim 16 further comprising:
   second extracting means for extracting the PKCS9 gateway class returns attribute values, wherein the values are represented as strings, numbers, and/or other non-abstract data types.

26. The data processing system of claim 16 further comprising:

fourth registering means for registering an attribute defined by the Public Key Cryptography Standards is registered with the PKCS9 gateway class.

27. A computer program product in a computer-readable medium for use in a data processing system for managing data attributes, the computer program product comprising:

first instructions for registering attributes with a PKCS9 gateway class, wherein the attributes include user-defined attributes and PKCS-standard (Public Key Cryptography Standards) defined attributes;

second instructions for associatively storing an identifier for each of the user-defined attributes and each of the PKCS-standard defined attributes;

instructions for calling a first object-oriented method in the PKCS9 gateway class, wherein the object-oriented method receives a parameter comprising an object identifier for an attribute;

instructions for searching an attribute mapping data structure using the object identifier in the received parameter;

instructions for retrieving, in response to a determination of a matching object identifier in the attribute mapping data structure, a class identifier associatively stored with the matching object identifier in the attribute mapping data structure; and instructions for calling a second object-oriented method in a class identified by the retrieved class identifier.

28. A computer program product on a computer-readable medium for use in a data processing system for managing Public Key Cryptography Standards (PKCS) compatible attributes, the computer program product comprising:

instructions for constructing a new instance of an attribute object;

instructions for differentiating between attribute objects of different types;

instructions for converting an instance of an attribute object to and from DER-encoding;

instructions for extracting values associated with an attribute object; and instructions for extending a set of attributes with user-defined types; and instructions for registering an attribute class with a PKCS9 gateway class, wherein a PKCS-compatible attribute is registered with the PKCS9 gateway class, and wherein user-defined attributes are registered with the PKCS9 gateway class by reading a configuration file when the PKCS9 gateway class is initially loaded.

29. The computer program product of claim 28, where a PKCS compatible attribute is a unique object identifier and value, as defined by the Abstract Syntax Notation (ASN.1) for the X.500 Attribute type.

30. The computer program product of claim 28, wherein an abstract attribute object class with an undefined attribute object subclass and a defined attribute object subclass, wherein the defined attribute object subclass is further comprised of a subclass for each PKCS-defined attribute object and a subclass for each user-defined attribute object.

31. The computer program product of claim 28, wherein a new instance of a PKCS-compatible attribute object is constructed using a class constructor.

32. The computer program product of claim 28, wherein a new instance of a PKCS-compatible attribute object is constructed using the PKCS9 gateway class if an attribute object identifier and a class implementing that attribute is registered.

33. The computer program product of claim 28, wherein a new instance of a PKCS-compatible attribute object is constructed using the PKCS9 gateway class based on a DER-encoded byte stream.

34. The computer program product of claim 28, wherein a type for an attribute object is determined by performing an instanceof comparison to registered attribute classes.

35. The computer program product of claim 28, wherein an attribute object is encoded to a DER-encoded object by using an encode method of the attribute object.

36. The computer program product of claim 28, wherein an attribute object represented as a DER-encoded string is decoded to an attribute object by using a decode method of the attribute object.

37. The computer program product of claim 28, wherein the PKCS9 gateway class returns attribute values, wherein the values are represented as strings, numbers, and/or other non-abstract data types.

38. The computer program product of claim 28, wherein an attribute defined by the Public Key Cryptography Standards is registered with the PKCS9 gateway class.

* * * * *